(12) United States Patent
Schmidt et al.

(10) Patent No.: US 7,970,710 B2
(45) Date of Patent: Jun. 28, 2011

(54) METHOD FOR CARRYING OUT THE PREMIUM-BASED RECOMMENDATION OF CONTENT OBJECTS THAT CAN BE DOWNLOADED TO A MOBILE TERMINAL

(75) Inventors: Andreas Schmidt, Braunschweig (DE); Markus Trauberg, Velchede (DE)

(73) Assignee: Siemens Aktiengesellschaft, Munich (DE)

( * ) Notice: Subject to any disclaimer, the term of this patent is extended or adjusted under 35 U.S.C. 154(b) by 1221 days.

(21) Appl. No.: 10/546,602

(22) PCT Filed: Jan. 12, 2004

(86) PCT No.: PCT/EP2004/000135
§ 371 (c)(1),
(2), (4) Date: Aug. 23, 2005

(87) PCT Pub. No.: WO2004/077786
PCT Pub. Date: Sep. 10, 2004

(65) Prior Publication Data
US 2006/0150180 A1    Jul. 6, 2006

(30) Foreign Application Priority Data
Feb. 25, 2003 (DE) .................................. 103 08 011

(51) Int. Cl.
*G06Q 99/00* (2006.01)
(52) U.S. Cl. .......................................................... 705/59
(58) Field of Classification Search .................. 705/14, 705/50–59
See application file for complete search history.

(56) References Cited

U.S. PATENT DOCUMENTS
5,715,403 A * 2/1998 Stefik .............................. 705/44
6,226,618 B1 * 5/2001 Downs et al. .................... 705/1
7,110,985 B2 * 9/2006 Chase et al. .................... 705/59
(Continued)

FOREIGN PATENT DOCUMENTS
CA           2401982           9/2001
(Continued)

OTHER PUBLICATIONS
Mori R et al: "Superdistribution: An Electronic Infrastructure for the Economy of the Future" Joho Shori Gakkai Ronbunshi—Transactions of Information Processing Society of Japan, Tokyo, JP, vol. 38, No. 7, Jul. 1, 1997, pp. 1465-1472, XP002072402 ISSN: 0387-5806 p. 1465, left-hand column, paragraph 1.1-p. 1467, left-hand column, paragraph 1.3 figures 1,3.
(Continued)

*Primary Examiner* — Jalatee Worjloh
(74) *Attorney, Agent, or Firm* — Young & Thompson

(57) ABSTRACT

A method for carrying out the premium-based recommendation of content objects that can be downloaded to a mobile terminal includes the following steps: transmitting a first content object DRMC from a content provider IA to a first terminal EG A; transmitting a first rights object RO A from a rights provider RA to the first terminal; transmitting the content object DRMC*, together with an identification of the first terminal, from the first terminal to the second terminal EG B, and; requesting a second rights object RO B from the rights provider RA via the second terminal EG B, whereby the second rights object RO B permits the second terminal EG B to use the content object. In addition, the identification of the first terminal EG A is conveyed to the rights provider RA, and the rights provider can subsequently assign a premium to the first terminal EG A.

21 Claims, 2 Drawing Sheets

U.S. PATENT DOCUMENTS

| | | | |
|---|---|---|---|
| 7,277,870 B2 * | 10/2007 | Mourad et al. | 705/51 |
| 7,370,017 B1 * | 5/2008 | Lindeman et al. | 705/59 |
| 7,415,439 B2 * | 8/2008 | Kontio et al. | 705/53 |
| 7,505,760 B2 * | 3/2009 | Hurst et al. | 455/414.1 |
| 2001/0051925 A1 * | 12/2001 | kang | 705/51 |
| 2003/0018582 A1 * | 1/2003 | Yaacovi | 705/51 |
| 2003/0167352 A1 * | 9/2003 | Hoshiai et al. | 709/318 |
| 2005/0102240 A1 * | 5/2005 | Misra et al. | 705/59 |
| 2010/0217994 A1 * | 8/2010 | Ginter et al. | 713/176 |

FOREIGN PATENT DOCUMENTS

| | | |
|---|---|---|
| EP | 0 678 851 | 10/1995 |
| GB | 2 367 925 | 4/2002 |
| JP | 2001236388 | 8/2001 |
| WO | WO 03/034653 | 4/2003 |
| WO | WO 03034653 | 4/2003 |

OTHER PUBLICATIONS

Anonymous: "Open Standards for Digital Rights Management—Enable Paid Content Model, Version 1.0" Forum Nokia, "Online! Nov. 4, 2002, pp. 1-4, XP002283614 Retrieved from the Internet: <URL:http://web.archive.org/web/20030704034824/ncsp.forum.nokia.com/downloads/nokia/documents/Open_Stan_for_DRM_Enable_Paid_Content_Model.pdf>" retrieved on Jun. 8, 2004! p. 3-p. 4.

Mori et al.,"Superdistribution: An electronic infrastructure for the economy of the future", Transactions of Information Processing Society of Japan, vol. 38, No. 7, Jul. 1, 1997, pp. 1465-1472, XP-002072402.

"Open standards for digital rights management enable paid content model, version 1.0" forum Nokia, 'Online', Nov. 4, 2002, pp. 1-4, XP-002283614.

* cited by examiner

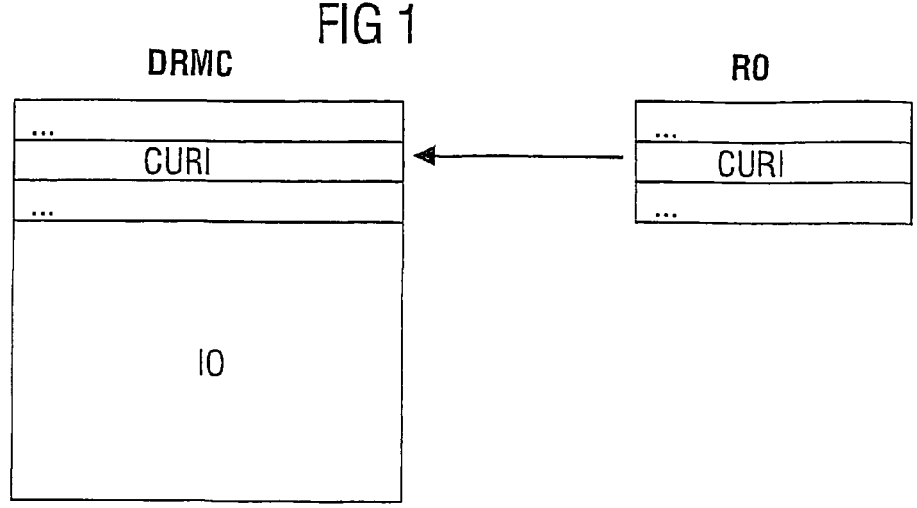
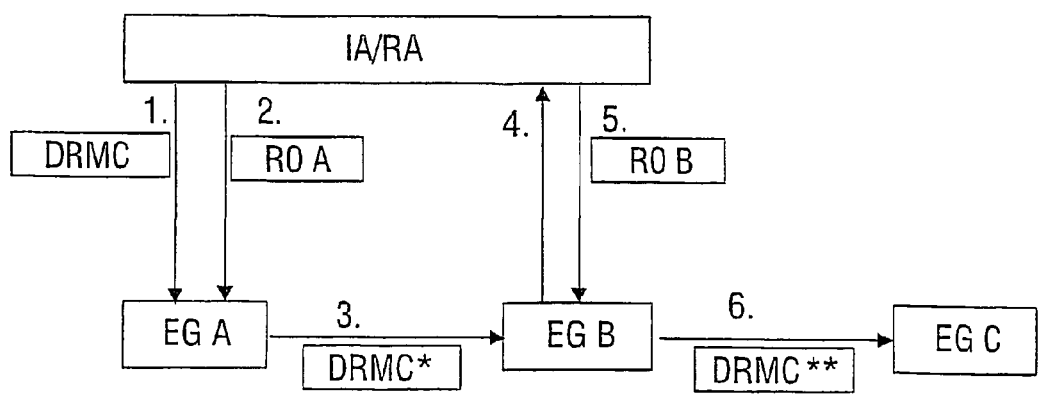

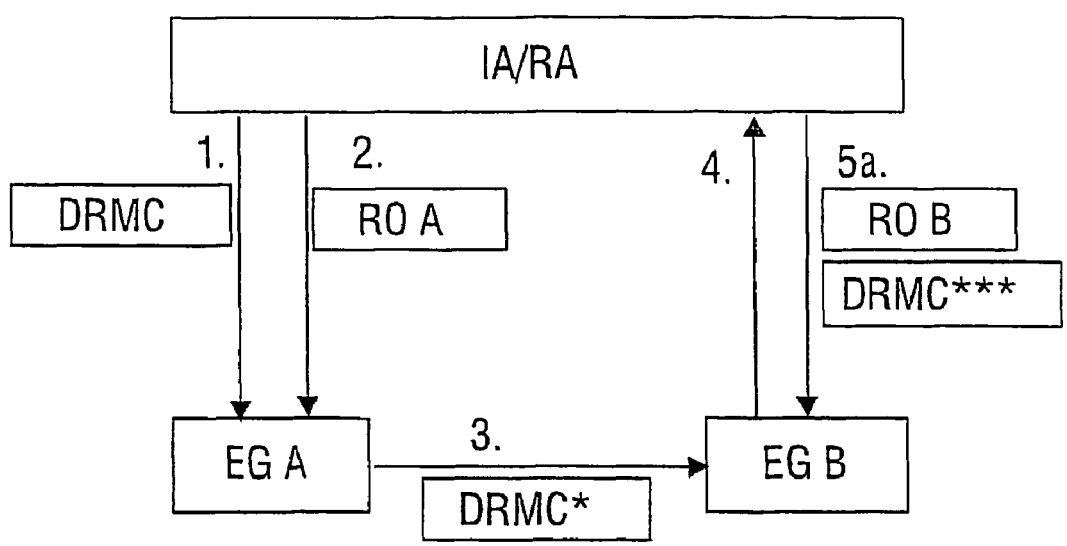

METHOD FOR CARRYING OUT THE PREMIUM-BASED RECOMMENDATION OF CONTENT OBJECTS THAT CAN BE DOWNLOADED TO A MOBILE TERMINAL

CROSS REFERENCE TO RELATED APPLICATIONS

This is the 35 USC 371 national stage of international application PCT/EP2004/000135 filed on 12 Jan. 2004, which designated the United States of America.

FIELD OF THE INVENTION

The present invention relates to a method for the premium-based recommendation of content objects that can be downloaded to a mobile radio terminal.

A method of said kind can be used, inter alia, in a mobile radio terminal.

A method by means of which digital content can be protected against accesses by unauthorized users and authorized users can be granted precisely defined rights for using said content is currently being specified by the Open Mobile Alliance (OMA). Said method is referred to as "Digital Rights Management" (DRM).

BACKGROUND OF THE INVENTION

To date, three different rights management methods have been defined and published by the Open Mobile Alliance. The three specified methods are known as "forward lock", "combined delivery" and "separate delivery":

With "forward lock", the media element(s) is (are) packaged into a new data type which contains certain items of signaling information in addition to the media elements. Linked with the data type newly defined therein ("application/oma.drm.message") is the restriction that the objects contained therein are not forwarded, not stored in the file system as freely accessible objects and may not be modified. Special handling of the objects of said type is therefore required by a terminal device.

With "combined delivery", the media elements are packaged into the same data type as in the case of the "forward lock" method. However, also contained therein in addition is a rights description by means of which further restrictions in relation to the use of the digital media objects can be specified. Examples thereof are the restriction on the usage time, usage frequency or usage type (e.g. "do not print").

With "separate delivery", the media objects are packaged in encrypted form into a further newly defined data type ("application/oma.drm.content"), referred to in the following as a DRMC ("Digital Rights Management Container"), which in turn contains signaling information. The encryption enables the content to be protected against unauthorized use, even if it is handled by an application without specific DRM functionality and is stored in the freely accessible storage area of a terminal device. In addition, a rights object (RO) is transmitted to the recipient via a secure channel. In textual coding this is the data type known as "application/vnd.oma.drm.rights+xml", and in binary coding the type known as "application/vnd.oma.drm.rights+wbxml".

The rights object (RO) plays a central role in the two methods "combined delivery" and "separate delivery". Said object contains the information concerning the rights linked to a content object (the rights description) and, when the "separate delivery" method is used, also the key for decrypting the encrypted content object in the DRMC.

The definition of the rights object is provided by the specification OMA-Download-DRMREL-v1_0-20020913-C in conjunction with an XML DTD (extensible Markup Language Document Type Definition) which can be downloaded from http://www.openmobilealliance.org/docs/drmrel10.dtd. Certain rights and constraints are contained in the current version of the definition for a rights object. The rights include:

"Play" (for audio-visual content),
"Display" (for visual content (images, video)),
"Execute" (for executable programs) and
"Print" (for producing a material copy of content such as e.g. images, texts or graphics).

With the "separate delivery" method, the content object (the media object requiring protection) is contained in the DRMC. FIG. 1 shows a referencing of a content object from within a rights object in the "separate delivery" method. The DRMC has two components: on the one hand the encrypted content object (IO) and on the other hand a header part containing control information and a description of the content object. The control information includes a reference ("rights issuer") to the rights provider (RA), which reference can be used by the terminal device to obtain further rights for the content object, and a unique reference, referred to as the "Content Uniform Resource Identifier" (CURI), which serves for referencing the content object from within the rights object (RO). Said reference (in the form of a URI) is used in the rights object as a reference for representing the connection between rights object and content object.

The separation of the content from the rights has conceptual advantages. As a result of the encryption of the content object in the DRMC, the content object can only be accessed by using the matching key. The DRMC is consequently rendered worthless as long as no matching key is available to an owner of the container. The DRMC can therefore be handled arbitrarily like another file. It can be copied and it is also possible and permitted to transfer or also to copy the DRMC from one terminal device (of user A) to another terminal device (of user B). This operation is referred to as "superdistribution". The receiving user B of a DRMC can obtain access to the content object in the DRMC if he or she uses the reference to a resource of the rights provider (right issuer). A DRMC send operation can execute as follows:

The terminal device of the receiving user B receives a DRMC from the terminal device of user A. User B then decides to purchase matching rights for the content object contained in the DRMC. Next, user B accesses the rights provider resource which is encoded in the DRMC with the header field "rights issuer". The rights provider thereupon offers user B a matching rights object for purchase. User B accepts the offer, buys a rights object and in the latter receives the key for decrypting the content object.

By means of this method an exchange of content objects between users is made possible, with the value added potential being preserved for the rights provider. The latter can charge a fee once again for the downloading of a rights object by user B, e.g. in an identical manner to the first downloading of a DRMC with associated rights object by user A.

It is in the interest of a provider of content objects here that a satisfied user A should recommend a downloaded content object to another user B and thereby create the basis for an additional sale of a matching rights object. In order to encourage the above described behavior of user A, which is desired by the provider of the content object, it is desirable to offer user A a bonus (premium) which the provider of the content object will grant user A upon a successful recommendation.

However, with the DRMC send operation described this is only possible to a limited extent in that a rights provider integrates into the DRMC a reference (header field "rights issuer") that is uniquely assigned to the first receiving user A. A download operation subsequently initiated by user B using said reference for a rights object would allow the rights provider to trace back the recommendation to user A. The described operation does, however, have the disadvantage that a DRMC cannot be assigned dynamically to different users and premiums. Multiple forwarding by different users, each having a new and individual premium description and concession, is therefore not possible.

SUMMARY OF THE INVENTION

The object underlying the present invention is therefore to provide a method for the premium-based recommendation of content objects that can be downloaded to a mobile radio terminal. The method enables information indicating that a download operation of a user B was motivated by the recommendation of the content object by a user A to be communicated to the provider of the content object so that said provider can grant the recommending user A a premium, while at the same time it is to be possible to assign a premium offer dynamically to the first recipient of a content object and also to each further recipient.

This object is achieved by a method for the premium-based recommendation of content objects that can be downloaded to a mobile radio terminal having the features recited in claim 1 and a mobile radio terminal having the features recited in claim 14.

The method according to the invention for the premium-based recommendation of content objects that can be downloaded to a mobile radio terminal comprises the method steps:

send a first content object from a content provider to a first terminal device;
   send a first rights object from a rights provider to the first terminal device;
   send the content object together with an identification of the first terminal device from the first terminal device to the second terminal device; and
   request a second rights object from the rights provider by the second terminal device, with the second rights object enabling the second terminal device to use the content object, and with the identification of the first terminal device being communicated to the rights provider and the latter thereupon being able to assign a premium to the first terminal device.

The content objects can be any type of data that can be received in a mobile radio terminal, such as, for example, image, music or video files. The content objects are preferably contained in a "Digital Rights Management Container"—DRMC, as described in the foregoing in connection with FIG. 1. In this case the DRMC containing the content object is transmitted. The content provider or, as the case may be, rights provider may be one and the same provider. In practice this will be the network provider in the majority of cases. The terminal devices can be any type of mobile radio terminals.

In a development of the present invention a reference to the rights provider is transmitted in addition together with the content object to the second terminal device. Said reference is preferably contained in a DRMC. By means of this reference the second terminal device knows from whom it can request the second rights object.

In order to avoid misuse and to be able to control access to the content object, in a preferred embodiment the supplemented identification for the first terminal device or the reference to the rights provider with integrated identification for the first terminal device is signed using a private key of the first terminal device.

In a further preferred embodiment of the present invention, the first terminal device signs the identification received from the rights provider in the rights object using its private key and integrates the signature into the data container or, as the case may be, the content object. The second terminal device integrates the signature together with the identification for the first terminal device into the request for a new rights object and transmits it to the rights provider. The rights provider verifies the authenticity of the first terminal device on the basis of the signature and so can be sure that the identification for the first terminal device has actually been integrated by the first terminal device into the data container or, as the case may be, the content object.

The first rights object preferably contains information indicating whether the user of the first terminal device will receive a premium upon successful recommendation of the content object to another user. The first rights object further preferably contains a description of the premium that the user of the first terminal device can receive. Thus, for example, the premium may be a credit on the user's (mobile radio) account or even content that can be used on the terminal device (e.g. a piece of music, an application, a game or an additional level of a game, possibly also in the form of an additional rights object).

In a preferred embodiment the first rights object contains the first terminal device's identification, which the first terminal device adds to the content object prior to its transmission to the second terminal device.

In a development of the present invention the first rights object contains signaling information indicating whether one or more identifications of previous terminal devices already contained in the content object are to be replaced and/or added to. In this case the signaling information can be a list consisting of separate elements or one element having a number of component parts. Said development enables premiums to be individually adjusted to the respective recommending user. It is conceivable, for example, that only the originally recommending user ever receives a premium even if the recommendation is passed on a number of times. Alternatively, the last recommending user in each case can be rewarded. A proportionate allocation of the premium is also conceivable.

Furthermore the first rights object may contain information regarding conditions and/or restrictions linked to a premium, in particular a period of validity of the premium. For example, a premium may only be redeemed from a specific provider or the premium must be redeemed by the end of the next month.

In a further preferred embodiment of the present invention the rights provider transmits a confirmation for the granting of the premium to the first terminal device so that the user thereof can manage a premium account.

According to a development of the present invention the second terminal device requests a content object matched to the characteristics of the second terminal device from the provider of the content objects. Not all mobile radio terminals have the same capabilities for using content objects. For example, only a first terminal device has a GPS (Global Positioning System) module for determining location and the second terminal device cannot use a content object adapted thereto. In such a case the second terminal device can request a content object matched to its characteristics, for example an adapted content object based on another location determining method. It is also conceivable that content objects are reduced in terms of their content to such an extent that they can be used by a particular mobile radio terminal. Toward that end, the receiving terminal device must signal to the provider of the content objects to indicate which content objects it can process.

The first and/or second terminal device further preferably display/displays to their/its users content object information that is only relevant with regard to the use of the content object. Internal information, that is to say information that is not relevant to the user with regard to the decision on whether he or she wants to download a content object is not displayed to him or her in this case.

In a development of the present invention a value referred to as a "hash value", that is to say a kind of checksum or a signature for the DRMC and/or the content object, is calculated. In the event of a change in the DRMC or, as the case may be, the content object—as is necessary in the present invention in order to integrate the identification for the user of the first terminal device—the hash value or the signature is accordingly rendered invalid if the calculation of the value also includes the change. In order to prevent this, the identification or, as the case may be, the reference to the rights issuer into which an identification is integrated and/or to which it is appended should be excluded from the calculation. Accordingly, a hash value or a signature should be calculated only for the information object or for the information object and a part of the DRMC header field. In this case a recalculation of the hash value and/or the signature for the content object by the terminal device should be avoided.

The object addressed at the beginning is also achieved by a mobile radio terminal for use with the method according to the invention.

The method according to the invention consists of extensions to the DRMC send operation described at the beginning, with the aim of enabling the content provider (IA) or, as the case may be, rights provider (RA) to identify and assign a recommendation operation and on this basis to reward a recommending user A with a premium for the successful recommendation of a content object to user B.

With the present invention it is made possible by means of message flow and signaling for the rights provider to conclude, from the communication with the terminal device of user B (EG B), that the request from EG B for a rights object is based on the recommendation of the DRMC or, as the case may be, DRMC* by EG A. The assignment is based on an identification that a rights provider defines for a user or that uniquely identifies a user (e.g. an e-mail address). The identification is preferably generated by the rights provider and initially transmitted to user A. This also allows an identification which is uniquely assigned to the transaction and which can also be embodied in such a way that it does not disclose the identity of user A to third parties. The identification together with the content object is passed on by user A to user B and transmitted in turn by the latter to the rights provider. The identification for user A can be transmitted by the rights provider to user A either integrated into the DRMC or integrated into the rights object or separately. Integration into the rights object is advantageous as this does not require the DRMC to be transmitted by the rights provider to EG A.

It is also conceivable for a content object integrated in a DRMC to be forwarded a number of times by different users or, as the case may be, their terminal devices. In order to create the same initial conditions for every user it therefore makes sense to integrate the information necessary to award a premium for a recommendation into the rights object, since the latter is delivered individually to each user. One possibility here is that only the last forwarding operation of the DRMC, that is to say the recommendation of the content object, is ever relevant for the assignment of a premium by a rights provider. Alternatively it is also possible to award a premium to the first recipient of a DRMC for all subsequent successful recommendation operations or also to award a premium to some or all of the users involved in a chain of recommendations.

An advantage of the method according to the invention is that an individual premium can be fixed by the rights provider for each forwarding/recommendation operation. This enables the premium to be made dependent on the recommending user, the time, the history of the forwarding of the content or, for example, on the type of content. It is also possible to reward the last forwarding user in each case for each forwarding operation. Alternatively, previous users can also be rewarded for each forwarding operation. In addition, the premium can be displayed and described to the recommending user. It is also advantageous that the identity of the recommending user can remain hidden from the user using the recommendation if the rights provider assigns the recommending user a unique identification from which a receiving user cannot deduce the identity of the recommending users.

BRIEF DESCRIPTION OF THE DRAWINGS

The invention is explained in more detail below with the aid of an exemplary embodiment and with reference to the attached drawings. The features presented therein and also the features already described in the foregoing can be essential to the invention not only in the cited combination but also individually or in other combinations. The figures show:

FIG. 1 the referencing of a content object from within a rights object with the "separate delivery" method;

FIG. 2 a message flow for the recommendation of a DRMC transmitted by EG A to EG B; and FIG. 3 a message flow for the recommendation of a DRMC transmitted by EG A to EG B.

DETAILED DESCRIPTION OF THE INVENTION

FIG. 1 has already been explained in the introduction to the description so reference thereto is made here.

FIG. 2 shows as an exemplary embodiment a terminal device EG A of a user A, a terminal device EG B of a user B, a content provider IA and a rights provider RA. A content object is transmitted in a DRM container DRMC by the content provider IA to the terminal device EG A of user A (step 1). In this exemplary embodiment the DRMC corresponds to the DMRC shown in FIG. 1. Alternatively the DRMC may also have been transmitted to EG A by another terminal device. A rights object RO A is then transmitted by the rights provider RA to the terminal device EG A (step 2). As well as the known information it contains one or more of the following elements:

a) signaling information indicating that user A can receive a premium upon successful recommendation of the DRMC to other users;
b) a description of the premium which user A can receive following a successful recommendation;
c) an identification which the terminal device of user A is to integrate into the DRMC before the DRMC is forwarded to another user, e.g. to user B;
d) a description of possible conditions and/or restrictions that are linked to a premium for a recommendation (e.g. a period of validity or suchlike);
e) signaling information indicating whether information according to c) that is already present in the DRMC is to be replaced or added to.

The terminal device EG A extracts said information from the rights object RO A and displays it either in full or in the form of extracts to the user of the terminal device EG A. If user A opts for a forwarding or, as the case may be, recommendation of the content object, or else, independently thereof, the terminal device EG A integrates the identification for user A into the DRMC, which consequently becomes the DRMC*. As confirmation of the authenticity of the identification EG A can also sign the identification using the private key of the device. The signature can subsequently be checked by the rights provider RA to ensure that the entered identification has also actually been inserted by the correct EG A. The DRMC is then transported from EG A to EG B (step 3). This can be effected for example using multimedia service MMS, e-mail, Bluetooth, infrared interface IrDA, memory card, cable or suchlike. The terminal device EG B receives the DRMC* and offers user B the option to download a rights object RO B for the content object contained therein from the rights provider. If this is confirmed by user B, EG B uses the reference to the resource of the rights provider ("rights issuer") and also the identification contained in the DRMC* for user A in order to request a rights object RO B from the rights provider RA (step 4). This can be accomplished for example by appending the identification in a defined manner to the reference (URL—Uniform Resource Locator) of the rights provider RA. The rights provider RA thus receives the information regarding who has forwarded the DRMC* to user B and can assign the latter a premium. With this operation EG B can optionally also display to user B the information that user A has integrated his or her identification in the DRMC* and that user A will receive a premium if user B requests or downloads a rights object RO B from the rights provider. An RO is then transmitted by the RA to the terminal device EG B (step 5).

It is also conceivable that the RA delivers a confirmation of the granting of the premium to EG A and/or EG B (not shown in FIG. 2). For EG B, this can be effected either integrated into the RO or separately. The terminal devices can display any notification received of the granting of the premium to the user. The premium is intrinsically independent of the DRM method.

The operation can then start over from the beginning. The DRMC (or DRMC*) is present on EG B. With the new rights object (RO B), up-to-date data can again be transmitted for a potential next recommendation operation by user B to EG B (signaling for a premium upon recommendation, description of the premium and identification for EG B/user B, etc.). Step 6 accordingly shows a forwarding of the DRMC** to a further terminal device EG C.

The identification for EG B/user B can be integrated into the DRMC* by EG B either instead of the previous identification for EG A/user A or in addition. This can be signaled in addition in the rights object.

As well as the exemplary embodiment described in the foregoing, namely only to download a matching rights object to EG B, it is also possible to download a content object matched to the characteristics of EG B. This will be necessary if the content object in the DRMC* is not, or not optimally, matched to the characteristics of EG B. EG B can ascertain this initially by checking the description, contained in the DRMC*, of the properties of the content object. Alternatively the rights provider RA can also determine on the basis of the description, transmitted by the terminal device EG B, of its characteristics that a different DRMC is better suited for EG B. As an alternative to requesting only the rights object, as shown in FIG. 1, EG B can then additionally request a more suitable DRMC***. This operation is independent of the granting of a premium.

FIG. 3 shows an exemplary embodiment with a corresponding message flow for the recommendation of a DRMC transmitted by EG A to EG B. In the figure, steps 1 to 4 correspond to steps 1 to 4 according to FIG. 2. In step 5a, however, in addition to the rights object RO B, a DRM container DRMC*** containing a variant of the content object that is particularly suitable for the terminal device EG B is transmitted by the content provider IA or, as the case may be, rights provider RA to the terminal device EG B.

As an alternative to the method described, a variant is also conceivable wherein the recommendation by EG A reaches EG B via the rights provider RA. For this purpose EG A must communicate the contact information of EG B to the RA, whereupon the RA sends a message or a DRMC to EG B, which communication can be effected using, for example, WAP (Wireless Application Protocol) push technology.

The invention claimed is:

1. A method for a premium-based recommendation of content objects that can be downloaded to a mobile radio terminal, comprising the method steps:
    sending a first content object from a content provider to a first terminal device;
    generating by a rights provider an identification of the first terminal device uniquely allocated to an actual transaction;
    integrating the identification of the first terminal device into a first rights object;
    sending the first rights object containing the identification of the first terminal device from a rights provider to the first terminal device;
    extracting by the first terminal device the identification of the first terminal device from the first rights object;
    integrating by the first terminal device said identification of the first terminal device into the first content object, thus modifying the first content object;
    sending the modified first content object with integrated identification of the first terminal device from the first terminal device to the second terminal device; and
    requesting by the second terminal device a second rights object from the rights provider, with the second rights object enabling the second terminal device to use the modified first content object, and with the identification of the first terminal device being communicated to the rights provider and enabling the latter to assign a premium to the first terminal device.

2. The method as claimed in claim 1, wherein
    a reference to the rights provider is additionally transmitted to the second terminal device together with the modified first content object.

3. The method as claimed in claim 1, wherein
    the identification of the first terminal device or a reference to the rights provider with integrated identification of the first terminal device is signed with a private key of the first terminal device.

4. The method as claimed in claim 1, wherein
    the first terminal device signs the identification received from the rights provider in the first rights object using its private key and integrates the signature into a data container or, as the case may be, into the modified first content object.

5. The method as claimed in claim 1, wherein
    the first rights object contains information indicating whether the user of the first terminal device will receive a premium upon successful recommendation of the first content object to another user.

6. The method as claimed in claim 1, wherein the first rights object contains a description of the premium that the user of the first terminal device can receive.

7. The method as claimed in claim 1, wherein the first rights object contains signaling information indicating whether one or more identifications of previous terminal devices already contained in the modified first content object are to be replaced and/or added to by the identification that is to be integrated into the first content object by the first terminal device.

8. The method as claimed in claim 1, wherein the first rights object contains information regarding conditions and/or restrictions linked to a premium, in particular a period of validity of the premium.

9. The method as claimed in claim 1, wherein the rights provider transmits a confirmation of a granting a premium to the first terminal device.

10. The method as claimed in claim 1, wherein the second terminal device requests a second content object and matches said second content object to characteristics of the second terminal device from the provider of the content objects.

11. The method as claimed in claim 1, wherein the first and/or the second terminal device only displays to their/its users first content object information that is used to determine whether the first content object is downloaded.

12. The method as claimed in claim 1, wherein transmitting, by the second terminal device, a description, and
the rights provider establishes on the basis of a description, transmitted by the second terminal device, of characteristics of the second terminal device that a second content object is used by the second terminal device and transmits said second content object to the second terminal device.

13. The method as claimed in claim 1, further comprising: a first terminal device performing the steps of:
receiving a first content object from a content provider by the first terminal device;
receiving a first rights object from a rights provider by the first terminal device; and
sending a third content object together with an identification of the first terminal device from the first terminal device to a second terminal device.

14. The method as claimed in claim 1, further comprising: a second terminal performing the step of:
requesting a second rights object from a rights provider by the second terminal device, wherein the second rights object enables the second terminal device to use a third content object that was sent to it together with an identification of a first terminal device.

15. A method for recommending content objects, comprising the method steps:
sending a first content object from a terminal device to a first terminal device;
generating by a rights provider an identification of the first terminal device uniquely allocated to an actual transaction;
integrating the identification of the first terminal device into a first rights object;
sending the first rights object containing the identification of the first terminal device from the rights provider to the first terminal device;
extracting by the first terminal device the identification of the first terminal device from the first rights object;
integrating by the first terminal device said identification of the first terminal device into the first content object, thus modifying the first content object;
sending the modified first content object with integrated identification of the first terminal device from the first terminal device to a second terminal device; and
requesting by the second terminal device, a second rights object from the rights provider, with the second rights object enabling the second terminal device to use the modified first content object, and with the identification of the first terminal device being communicated to the rights provider in order to enable the rights provider to assign the recommendation operation relating to the first content object to the first terminal device.

16. The method as claimed in claim 15, wherein the rights provider assigns a premium to the first terminal device in response to the communication of the identification of the first terminal device.

17. The method as claimed in claim 15, further comprising:
extracting the identification of the first terminal device from the first rights object upon receipt of the first rights object by the first terminal device.

18. The method as claimed in claim 17, wherein the first terminal device integrates the extracted identification of the first terminal device into the modified first content object.

19. The method as claimed in claim 18, wherein, during the integration of the identification of the first terminal device into the first content object, an identification already contained in the first content object is replaced by the identification of the first terminal device.

20. The method as claimed in claim 15, wherein the rights provider transmits the requested second rights object together with the identification of the second terminal device to the second terminal device.

21. The method as claimed in claim 20, wherein the second terminal device extracts the identification of the second terminal device from the second rights object, integrates it in the first content object in place of the identification of the first terminal device and forwards it to a third terminal device.

* * * * *